(12) United States Patent
Schuricht et al.

(10) Patent No.: US 9,217,610 B2
(45) Date of Patent: Dec. 22, 2015

(54) HEAT EXCHANGER FOR EXHAUST GAS RECIRCULATION

(75) Inventors: Scott R. Schuricht, Edwards, IL (US); Anthony L. Deluca, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 657 days.

(21) Appl. No.: 13/549,936

(22) Filed: Jul. 16, 2012

(65) Prior Publication Data

US 2014/0014077 A1    Jan. 16, 2014

(51) Int. Cl.
| | |
|---|---|
| F02M 25/07 | (2006.01) |
| F28F 9/02 | (2006.01) |
| F28D 7/16 | (2006.01) |
| F28D 21/00 | (2006.01) |

(52) U.S. Cl.
CPC .......... *F28F 9/0275* (2013.01); *F02M 25/0737* (2013.01); *F28D 7/1684* (2013.01); *F28D 21/0003* (2013.01); *F28F 9/026* (2013.01); *F28F 2265/26* (2013.01); *Y02T 10/121* (2013.01)

(58) Field of Classification Search
CPC . F28D 7/0041; F28D 21/0003; F28D 7/1684; F28D 3/02; F28F 9/0275
USPC ......... 165/160, 164–169, 171, 175–177, 183, 165/139, 157, 158; 123/568.12, 568.17; 261/150–154
See application file for complete search history.

(56) References Cited

U.S. PATENT DOCUMENTS

| | | | |
|---|---|---|---|
| 4,055,158 A * | 10/1977 | Marsee | 123/568.12 |
| 5,440,880 A | 8/1995 | Ceynow et al. | |
| 5,732,688 A | 3/1998 | Charlton et al. | |
| 6,244,256 B1 | 6/2001 | Wall et al. | |
| 6,311,678 B1 | 11/2001 | Lepoutre | |
| 6,748,741 B2 | 6/2004 | Martin et al. | |
| 7,845,339 B2 | 12/2010 | Cecil et al. | |
| 7,882,827 B2 | 2/2011 | Grunenwald et al. | |
| 7,931,013 B2 | 4/2011 | Castano Gonzalez et al. | |
| 7,987,666 B2 | 8/2011 | Branning et al. | |
| 8,162,042 B2 * | 4/2012 | Haglid | 165/165 |
| 2003/0010480 A1 * | 1/2003 | Shibagaki et al. | 165/158 |
| 2003/0116310 A1 * | 6/2003 | Wittmann et al. | 165/153 |
| 2007/0062679 A1 * | 3/2007 | Agee et al. | 165/158 |
| 2007/0204614 A1 * | 9/2007 | Kolb | 60/599 |
| 2008/0264609 A1 * | 10/2008 | Lutz et al. | 165/104.19 |
| 2009/0032212 A1 * | 2/2009 | Dogan et al. | 165/41 |
| 2009/0194266 A1 * | 8/2009 | Conrad et al. | 165/165 |

FOREIGN PATENT DOCUMENTS

| | | |
|---|---|---|
| JP | 2008-231929 A | 10/2008 |
| JP | 2009-114923 A | 5/2009 |

\* cited by examiner

*Primary Examiner* — Stephen K Cronin
*Assistant Examiner* — Joseph Dallo
(74) *Attorney, Agent, or Firm* — Leydig, Voit & Mayer, Ltd.

(57) ABSTRACT

A heat exchanger associated with an exhaust gas recirculation system cools the exhaust gasses before directing them to an internal combustion engine. The heat exchanger can include a tube core having a plurality of exhaust gas tubes that can extend along a longitudinal axis. The tube core can also include a plurality of coolant channels disposed between and spacing apart the plurality of exhaust gas tubes. A coolant inlet line is disposed about at least a portion of the tube core to direct coolant inwardly toward the coolant channels. At least a portion of the coolant can converge approximately at the longitudinal axis line.

20 Claims, 7 Drawing Sheets

HEAT EXCHANGER FOR EXHAUST GAS RECIRCULATION

TECHNICAL FIELD

This patent disclosure relates generally to heat exchangers for the transfer of thermal energy and, more particularly, to a heat exchanger for cooling exhaust gas in an exhaust gas recirculation system associated with an internal combustion engine.

BACKGROUND

Internal combustion engines burn a hydrocarbon-based fuel or another combustible fuel source to convert the potential or chemical energy therein to mechanical power that can be utilized for other work. The combustion of fuel produces byproducts and emissions that the U.S. Government and other governments regulate. To comply with these regulations, engine manufacturers have developed a number of methods for reducing or treating the emissions created by the internal combustion process. One such method is exhaust gas recirculation (EGR) in which a portion of the exhaust gasses produced by the combustion process are recirculated and intermixed with the incoming intake air. The EGR process deters creation of nitrogen oxides such as NO and $NO_2$, commonly referred to as $NO_X$, during combustion. Because the exhaust gasses are typically still hot after their initial combustion, the EGR system often cools the emissions prior to recirculation to avoid disrupting the combustion process or to gain additional performance advantages.

Heat exchangers are devices that transfer thermal energy from one medium to another. For example, a process fluid may pass through a heat exchanger and transfer its thermal energy to a coolant before being returned to the process. An EGR system may utilize one or more heat exchangers to cool the hot exhaust gasses before returning them to the combustion process. One problem that may arise with heat exchangers, though, is the introduction and distribution of the two mediums, i.e., process fluids and coolant, within the heat exchanger. The two fluids must flow proximate to each other in order to adequately exchange thermal energy but must remain separated to avoid leakage. If the interface between the process fluid and coolant is poorly designed, efficiency of the thermal exchange may be undesirably low and leaks may occur.

Japanese Patent Publication 200900131285912 (JP '912), entitled "Cooling Water Inlet Structure of Heat Exchanger for EGR Cooler," purports to address the problem of poor coolant distribution. The JP '912 publication describes a heat exchanger having at least two coolant inlets along one side of the heat exchanger. The design of the JP '912 publication, however, may still produce a less-than-uniform coolant distribution in the heat exchanger and therefore thermal efficiency may still be less than optimum. Accordingly, there is a need for an improved heat exchanger.

SUMMARY

In one aspect, the disclosure describes a heat exchanger for an exhaust gas recirculation unit associated with an internal combustion engine. The heat exchanger includes a tube core having a plurality of exhaust gas tubes extending from an upstream face to a downstream face to define a longitudinal axis line. The tube core can also include a plurality of coolant channels disposed between and separating the plurality of exhaust gas tubes. The exchanger can also include a coolant inlet line disposed substantially about the tube core proximate the upstream face and generally perpendicular to the longitudinal axis line. The coolant line is arranged to direct coolant inwardly toward the longitudinal axis line with at least a portion of the coolant converging at the longitudinal axis line.

In another aspect, the disclosure describes a method of cooling exhaust gasses in an exhaust gas recirculation (EGR) system. The method provides a tube core including a plurality of tubes separated from each other by coolant channels. A coolant inlet line is disposed around the tube core. Exhaust gasses are introduced to the plurality of tubes. The method then directs coolant from the coolant inlet line to the coolant channels via an introduction path that is disposed substantially about the tube core.

In yet another aspect, the disclosure describes a heat exchanger for an exhaust gas recirculation system including a tube core with a plurality of exhaust gas tubes extending between an upstream face and a downstream face. Coolant channels fluidly separate the exhaust gas tubes from each other. An exhaust gas inlet diffuser is in fluid communication with the upstream face of the tube core and an exhaust gas exit diffuser is in fluid communication with the downstream face. The heat exchanger also includes a coolant inlet line disposed about and separated from the tube core proximate the upstream face. The coolant inlet line can fluidly communicate with the coolant channels by a coolant introduction path directed inwardly toward the tube core from at least two opposing directions.

The disclosure also provides, in another aspect, an exhaust gas recirculation (EGR) system associated with an internal combustion engine that includes an EGR line diverting a portion of the exhaust gasses from an exhaust system of the internal combustion engine to an intake system of the internal combustion system. The internal combustion system may include a coolant system circulating coolant. The EGR system includes a heat exchanger disposed in the EGR line and that has a plurality of exhaust gas tubes receiving hot exhaust gasses. The exhaust gas tubes are separated from each other by a plurality of coolant channels. The heat exchanger further includes a coolant inlet line disposed substantially about the plurality of exhaust gas tubes to introduce coolant inwardly to the coolant channels.

DETAILED DESCRIPTION

Figure 1:
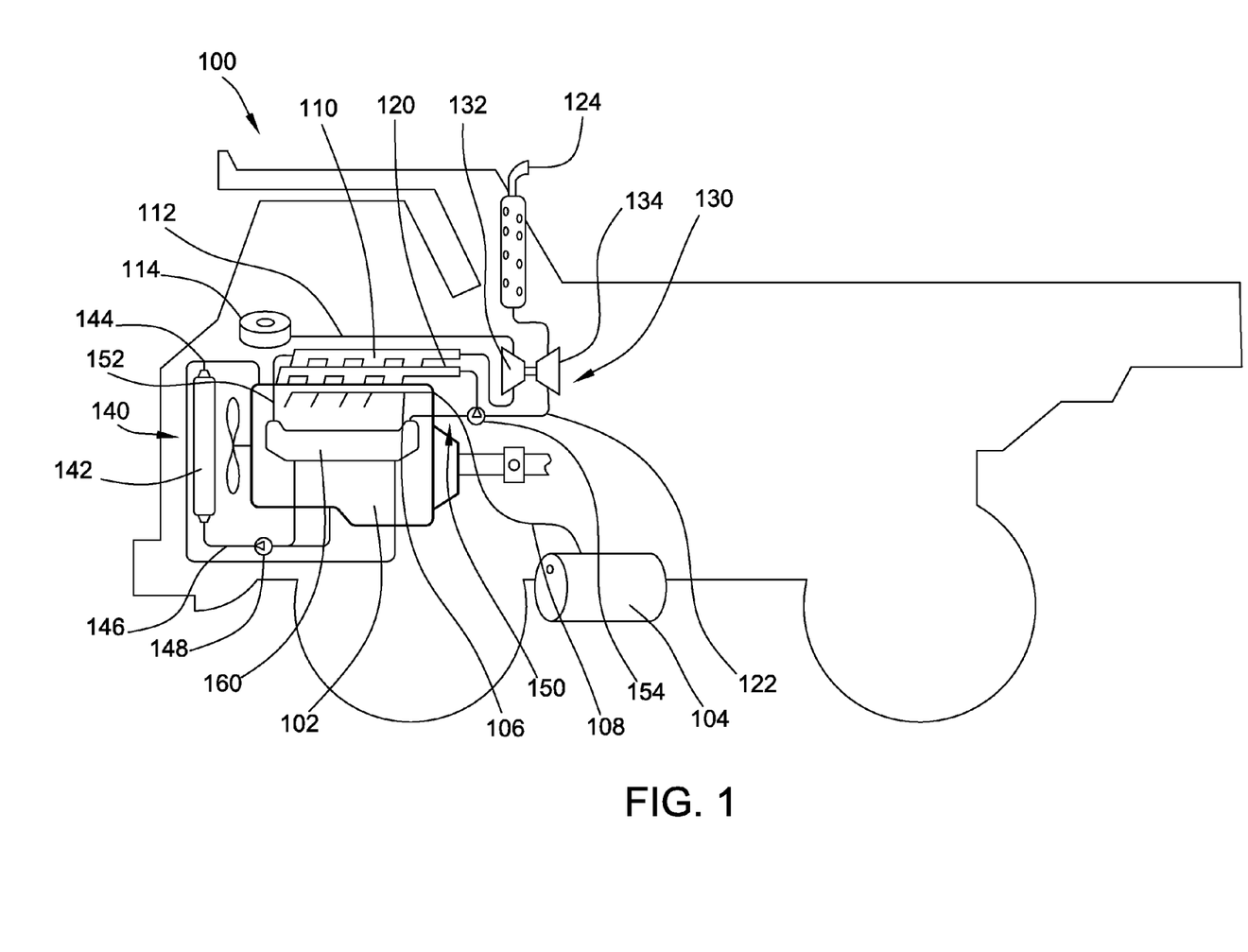
FIG. 1 is a schematic diagram representing an internal combustion engine on a machine that includes an EGR system for recirculating exhaust gasses to the combustion process by mixing the gasses with the intake air.

Now referring to the drawings, wherein like reference numbers refer to like elements, there is illustrated a machine 100 powered by an internal combustion engine 102 adapted to combust a fuel to release the chemical energy therein and convert that energy to mechanical power. The machine can be an "over-the-road" vehicle such as a truck used in transportation or may be any other type of machine that performs some type of operation associated with an industry such as mining, construction, farming, transportation, or any other industry known in the art. For example, the machine may be an off-highway truck, earth-moving machine, such as a wheel loader, excavator, dump truck, backhoe, motor grader, material handler or the like. The term "machine" can also refer to stationary equipment like a generator that is driven by an internal combustion engine to generate electricity. The specific machine illustrated in FIG. 1 is dump truck.

The internal combustion engine 102 can be a compression ignition engine that combusts diesel fuel, though in other embodiment it can be a spark ignition engine that combusts gasoline or other fuels such as ethanol, bio-fuels, or the like. To store and supply the internal combustion engine with fuel 100 for the combustion process, the machine 100 can include a fuel reservoir 104 that is in fluid communication with a fuel rail 106 on the machine by way of a fuel line 108. To direct intake air used in the combustion process to the internal combustion engine 102, an intake manifold 110 can be disposed over the engine and in fluid communication with the combustion chambers disposed therein. The intake manifold 110 can receive intake air from an intake line 112 that may draw atmospheric air through an air intake filter 114. Similarly, to direct the exhaust gasses produced by the combustion process from the internal combustion engine 102, an exhaust manifold 120 can extend over the engine and can be in fluid communication with the combustion cylinders. The intake manifold 110 and the exhaust manifold 120 are depicted in an overlapping fashion, but in other embodiments can be disposed in any suitable arrangement including being integrally formed into the internal combustion engine 102 itself. The exhaust manifold 120 can direct exhaust gasses to an exhaust line 122 that terminates at an exhaust orifice 124 that releases the gasses back to the atmosphere.

To assist in directing intake air into the internal combustion engine 102, the machine can include a turbocharger 130. The turbocharger 130 includes a compressor 132 disposed in the intake line 112 that compresses intake air drawn from the atmosphere and directs the compressed air to the intake manifold 110. Although a single turbocharger 130 is shown, more than one such device connected in series and/or in parallel with another can be used. To power the compressor 132, a turbine 134 can be disposed in the exhaust line 122 and can receive pressurized exhaust gasses from the exhaust manifold 120. The pressurized exhaust gasses directed through the turbine 134 can rotate a turbine wheel having a series of blades thereon, which powers a shaft that causes a compressor wheel to rotate within the compressor housing pressurizing the intake air.

To remove heat produced by the internal combustion process and cool the internal combustion engine 102, the machine can include a coolant system 140 that can direct a coolant such as water or radiator fluid through the engine. The coolant circulating through the engine absorbs heat therein in the form of thermal energy and, upon exiting the engine, discharges the thermal energy to the atmosphere. The coolant system 140 can include a radiator 142, such as an air-cooled crossflow radiator disposed in a location where a sufficient amount of air will pass over and/or through it. To deliver cooled coolant to the internal combustion engine 102, the radiator can communicate with a cold line or feed line 144, and to receive heated coolant returning from the engine, the radiator can be operatively connected to a hot line or return line 146. To pressurize and forcibly direct the coolant through the coolant system 140, a coolant pump 148 can be disposed in the feed line 144, the return line 146 or elsewhere in the coolant system 140.

To reduce emissions produced by the combustion process, the internal combustion engine 102 can be operatively associated with an exhaust gas recirculation EGR system 150. An EGR system, as will be familiar to those of skill in the art, can redirect a portion of the exhaust gasses discharged from the combustion process back to the intake system and intermix the exhaust gasses with the intake air. The presence of exhaust gasses in the intake air lowers the relative proportion or amount of oxygen available for combustion in the combustion chamber, which results in a lower flame and/or combustion temperature. As a result, the combustion process generates less nitrogen oxides than would be produced in an oxygen rich environment that often results in higher combustion temperatures.

To redirect the exhaust gasses, the EGR system 150 can include an EGR line that communicates with the exhaust line 122 and that can be in fluid communication to the intake manifold 110 or intake line 112. To selectively control the amount of exhaust gasses redirected to the EGR process, the EGR system 150 can include an adjustable EGR valve 154, such as a butterfly valve, disposed in the EGR line 152. In the illustrated embodiment, the EGR line 152 accesses the exhaust line 122 upstream of the turbine 134 so as to receive high-pressure exhaust gasses that have not lost pressure through the turbine and is thus referred to as a high-pressure EGR system. In other embodiments, the EGR line 152 may intersect the exhaust line 122 downstream of the turbine 134 to receive depressurized exhaust gasses and may thus be considered a low-pressure EGR system.

Figure 2:
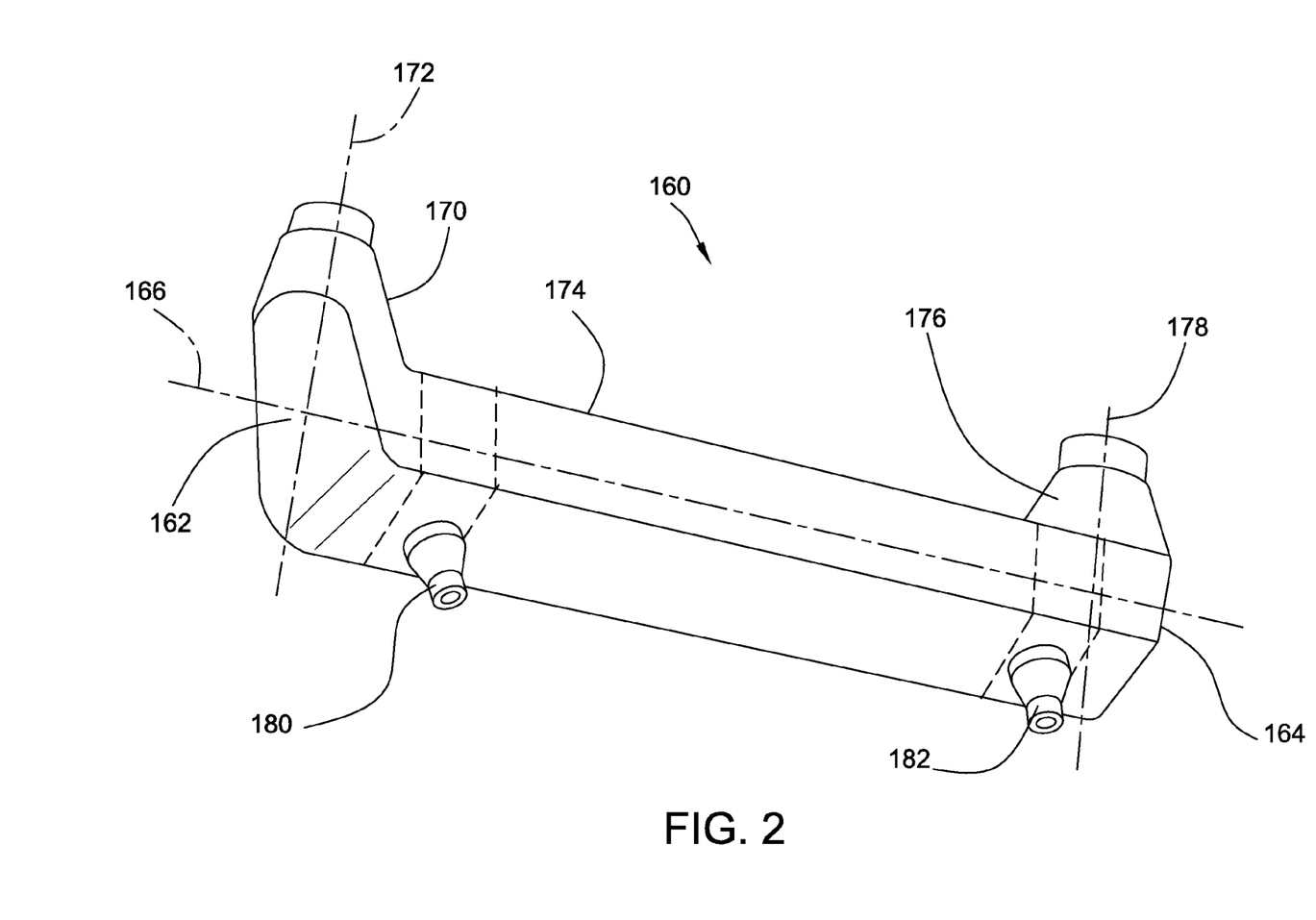
FIG. 2 is a perspective view of a heat exchanger that may be used to cool the exhaust gasses in the EGR system of FIG. 1

To cool the redirected exhaust gasses prior to recirculation with the intake air, the EGR system 150 can include a heat exchanger 160 operatively associated with the internal combustion engine 102 and the coolant system 140. In the illustrated embodiment, the heat exchanger 160 can be attached to the side of the internal combustion engine 102 but, in other embodiments, it can be located elsewhere on the machine 100. Referring to FIGS. 1 and 2, the heat exchanger 160 can be an elongated device extending between an upstream end 162 and a downstream end 164 so that it thereby defines or delineates a longitudinal axis line 166. The heat exchanger 160 can have a generally overall rectangular cross-sectional shape but in other embodiments can have any other suitable cross-sectional shape, like circular, octagonal, etc.

To receive the exhaust gasses, the heat exchanger can have an exhaust gas inlet diffuser 170 disposed at the upstream end 162 and that can connect to the EGR line 152 downstream of the EGR valve 154 and upstream of the intake manifold 110. The inlet diffuser 170 may widen from its connection point to the EGR line 152 to its attachment to the elongated, rectangular main body 174 of the heat exchanger 160 to assist in slowing the incoming, high-pressure exhaust gasses. Additionally, in the illustrated embodiment, the inlet diffuser 170 can define an inlet axis line 172 aligned with the flow direction of the incoming exhaust gasses and that is generally perpendicular to the longitudinal axis line 166 of the heat exchanger. The inlet diffuser 170 therefore directs the incoming exhaust gasses through a 90° turn or bend to realign flow with the longitudinal axis line 166 and uniformly distributes the exhaust gasses to the internal components of the heat exchanger 160. In a possible embodiment, the inlet diffuser can include a pivotal blade or baffle that can move within the diffuser to increase or restrict the flow area therein and thus help control the flow of exhaust gasses. To return the exhaust gasses to the EGR system 150 after passing through the heat exchanger 160, the heat exchanger can include a substantially identical exhaust gas exit diffuser 176 disposed at the downstream end than can connect with the remainder of the EGR line 152 to communicate with the intake manifold 110. The exit diffuser 176 can define an exit axis line 178 that is substantially parallel to the inlet axis line 172 and perpendicular to the longitudinal axis line 166. However, alternative embodiments may include configurations wherein the inlet diffuser 170 and exit diffuser 176 have non-coplanar axis lines To receive cooled coolant from the coolant system 140, the heat exchanger 160 can include a coolant feed connection 180 disposed proximate to the upstream end 162 in fluid communication with the coolant feed line 144. The coolant feed connection 180 can be any suitable type of connection such as a hose barb, a threaded hose fitting, or a more complex connection such as a quick-release fitting, or a permanent connection such as done by welding or brazing. The coolant feed inlet 180 can extend from the main body 174 of the heat exchanger 160 perpendicular to the longitudinal axis line 166 and parallel to the inlet axis line 172. To simplify connection with the coolant feed line 144, a single coolant feed inlet 180 can be included on the heat exchanger 160. To discharge the heated coolant from the heat exchanger 160, a substantially identical coolant return connection 182 is attached to the main body 174 proximate to the downstream end 164 and is oriented perpendicular to the longitudinal axis line 166 and parallel to the exit axis line 178. In an alternative embodiment, the coolant feed inlet 180 can extend from the main body 174 of the heat exchanger 160 perpendicular to the longitudinal axis line 166 and substantially orthogonal to the inlet axis line 172. Similarly, in an alternative embodiment, the coolant return connection 182 may be oriented perpendicular to the longitudinal axis line 166 and substantially orthogonal to the exit axis line 178.

Because the exhaust gas inlet diffuser 170 and coolant feed connection 180 are located proximate to the upstream end 162, and the exhaust gas exit diffuser 176 and coolant return connection 182 are located proximate to the downstream end 164, flow of both mediums, exhaust gas and coolant, will be generally directed from the upstream end to the downstream end. This arrangement is commonly referred to as a parallel flow-heat exchanger. In other embodiments of the disclosure, though, the inlets, exits and connections can be arranged for a counter-flow heat exchanger wherein exhaust gasses and coolant enter and exit at opposite ends of the heat exchanger. Additionally, the described embodiment of the heat exchanger is a single pass design in which the two conducting mediums make a single pass through the exchanger, but the disclosure is also applicable to multipass arrangements in which the mediums are directed to make multiple passes through the heat exchanger. The particular flow arrangement can depend in part upon size constraints, volume capacity and desired thermal efficiencies, and any suitable flow arrangement or variation thereof are contemplated as within the scope of the claims.

Figure 3:
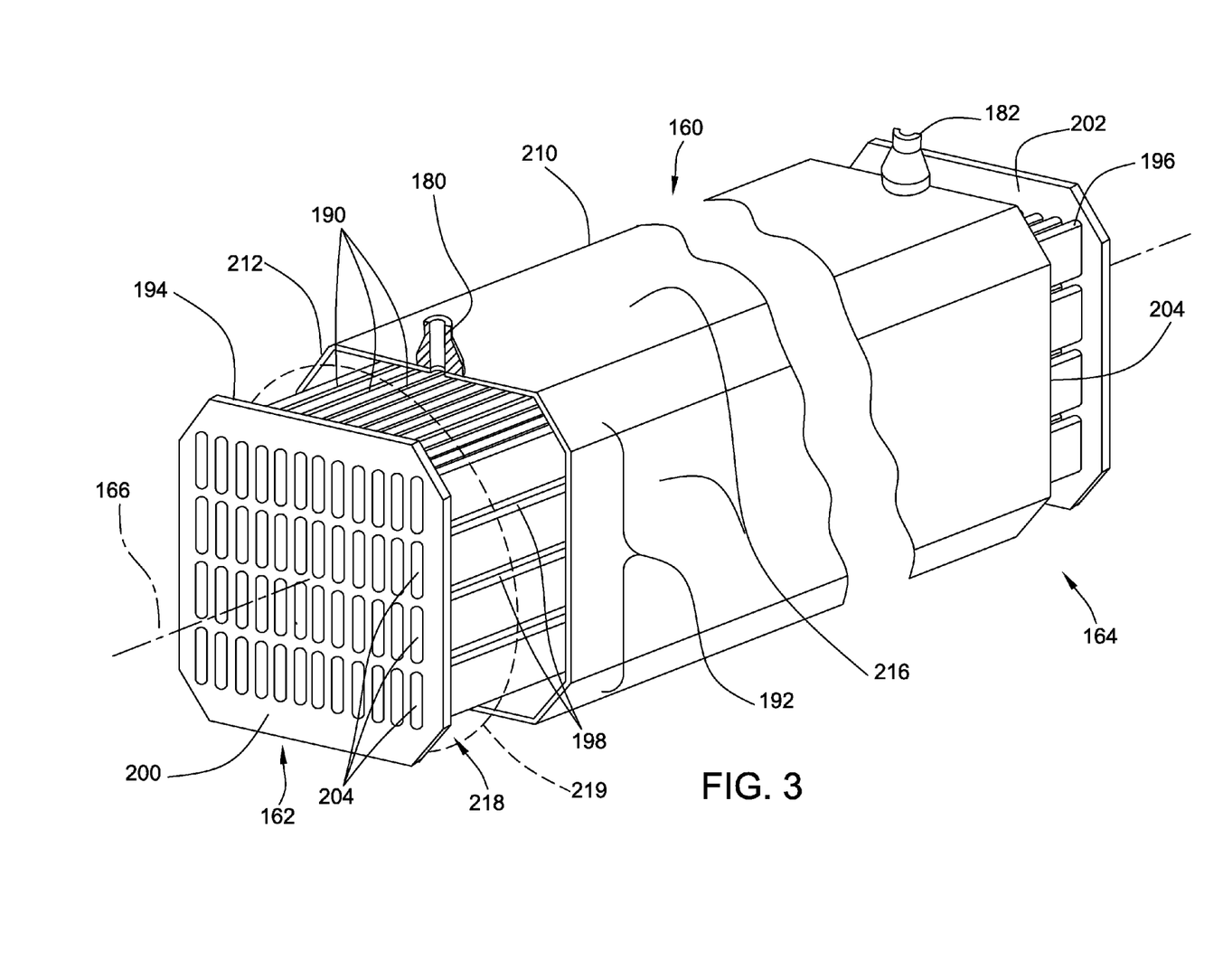
FIG. 3 is a perspective view of the upstream end of the heat exchanger of FIG. 2 with the shell partially retracted to display the header plate and the plurality of exhaust tubes disposed in the shell.

Referring to FIG. 3, there is illustrated the upstream end 162 and the downstream end 164 of a heat exchanger 160 with the diffusers removed to better illustrate the internal components of the heat exchanger 160. The heat exchanger 160 can be of the common shell-and-tube design in which a plurality of hollow tubes conducting one medium is enclosed in a shell containing the other medium that flows around and past the tubes. In FIG. 3, the hollow tubes 190 may be arranged in parallel as a plurality of tubes collectively referred to as a tube bundle or tube core 192. The plurality of tubes 190 and tube core 192 can be further aligned parallel to the longitudinal axis 166 of the heat exchanger 160. The tubes 190 can be generally elongated, straight structures extending coextensive with each other so that the tube core 192 includes an upstream face 194 and an opposing downstream face 196 that may correspond to the length of the main body of the heat exchanger 160. The plurality of tubes 190 can be arranged in a square or rectangular pattern but in other embodiments can have other arrangements. The tubes 190 can be made from any suitable material such as a thin-walled metal like aluminum, steel, or copper.

In the present embodiment, the hollow tubes 190 can be designated to conduct the exhaust gasses and maintain separation of the exhaust gasses from the coolant flowing over and around the tubes. To define coolant channels 198 in the tube core 192 for flow of coolant between the tubes 190, the plurality of tubes can be spaced apart from each other along their lengths so that elongated voids are created between and separate the tubes 190. To maintain the plurality of tubes 190 in a fixed, spaced-apart arrangement and thereby maintain the coolant channels 198, the elongated tubes can be fixed at one end to an upstream header plate 200 and at the opposite end to a downstream header plate 202. Thus, the upstream header plate 200 demarcates the upstream face 194 of the tube core 192 and the downstream header plate demarcates the downstream face 196. The header plates 200, 202 can be relatively thick, flat plates of a metallic material like steel or aluminum arranged perpendicular to the longitudinal axis line 166. To provide access to the interior of the hollow tubes 190, a plurality of apertures 204 can be disposed through the header plates 200, 202 with each aperture aligned to one corresponding tube. The tubes 190 can be welded, brazed or otherwise joined to the header plates 200, 202 to align with their respective apertures 204. In the illustrated embodiment, the apertures are oblong slots but, in other embodiments, could have other shapes.

The tube core 192 can be disposed in a hollow, outer housing or core shell 210. The core shell 210 can extend between a first rim 212 and an opposite second rim 214 and is generally disposed over and around the tube core 192 to retain the coolant within the coolant channels 198. The illustrated core shell 210 is a four-sided structure with four, integral longitudinal sides 216 to correspond to the rectangular or square arrangement of the tubes 190 in the tube core 192 but in other embodiments could have different shapes. Like the header plates 200, 202, the core shell 210 can be made from a metal such as steel or aluminum. The coolant feed connection 180 and the coolant return connection 182 can be disposed through one side 216 of the core shell 210 slightly behind the header plate 200, 202 to introduce and receive coolant to and from the tube core 192. Accordingly, the header plates 200, 202 constrain coolant in the core shell 210 to prevent coolant from entering the inlet and exit diffusers 170, 176 and intermixing with the exhaust gasses.

Referring to FIGS. 2 and 3, it can be appreciated that the incoming coolant will initially flow into the tube core 192 in a singular direction perpendicular to the longitudinal axis line 166 due to the orientation of the single coolant feed connection 180. The incoming coolant realigns approximately 90° to be parallel with the longitudinal axis line 166 and flows lengthwise along the tube core 192 to exit perpendicularly from the other end. This fluid realignment causes inconsistent distribution of coolant proximate the upstream and downstream faces 194, 196 of the tube core 192 such that fresh, incoming coolant might not adequately replenish existing coolant completely across the upstream and downstream faces. For example, pools of coolant may become trapped and stagnate at the corners of the tube core 192 opposite the coolant feed inlet 182 as indicated by arrow 218. Areas of localized thermal buildup may result, possibly leading to boiling or degradation of the trapped coolant. Additionally, because the tube core 192 joins the upstream and downstream header plates 200, 202 in these areas 218, the thermal buildup may cause thermal expansion of the parts resulting in cracking or leak formation proximate the joints. Coolant and exhaust gasses could intermix allowing coolant to access the combustion chamber of the internal combustion engine possibly leading to a hydro-lock condition.

The heat exchanger can therefore be equipped with a coolant inlet structure or system for improved introduction of coolant to the tube core to address the problem of inadequate distribution and localized heating. For example, the heat exchanger 160 can include a coolant inlet line, circuit or duct disposed substantially about the tube core 192 at the upstream end 162. For example, the coolant inlet line, circuit or duct can circumscribe the tube core in an imaginary loop generally indicated by the dashed circle 219 in FIG. 3. The coolant line, circuit or duct can provide multiple coolant introduction points or paths into the tube core. The introduction paths can be inwardly directed toward the centrally disposed longitudinal axis line 166 so that at least a portion of the incoming coolant will converge at the longitudinal axis line before realigning to flow lengthwise through the heat exchanger 160. The central convergence of incoming coolant from multiple sides of the tube core 192 or from multiple introduction paths provides for a more uniform distribution of coolant across the upstream face 194 of the tube core 192 and the adjacent upstream header plate 200. In other embodiments, the coolant line can extend approximately halfway around the tube core and can communicate with fluid introduction paths diametrically opposed to each other across the tube core so as to inwardly direct coolant toward each other and to converge at the longitudinal axis line.

Figure 4:
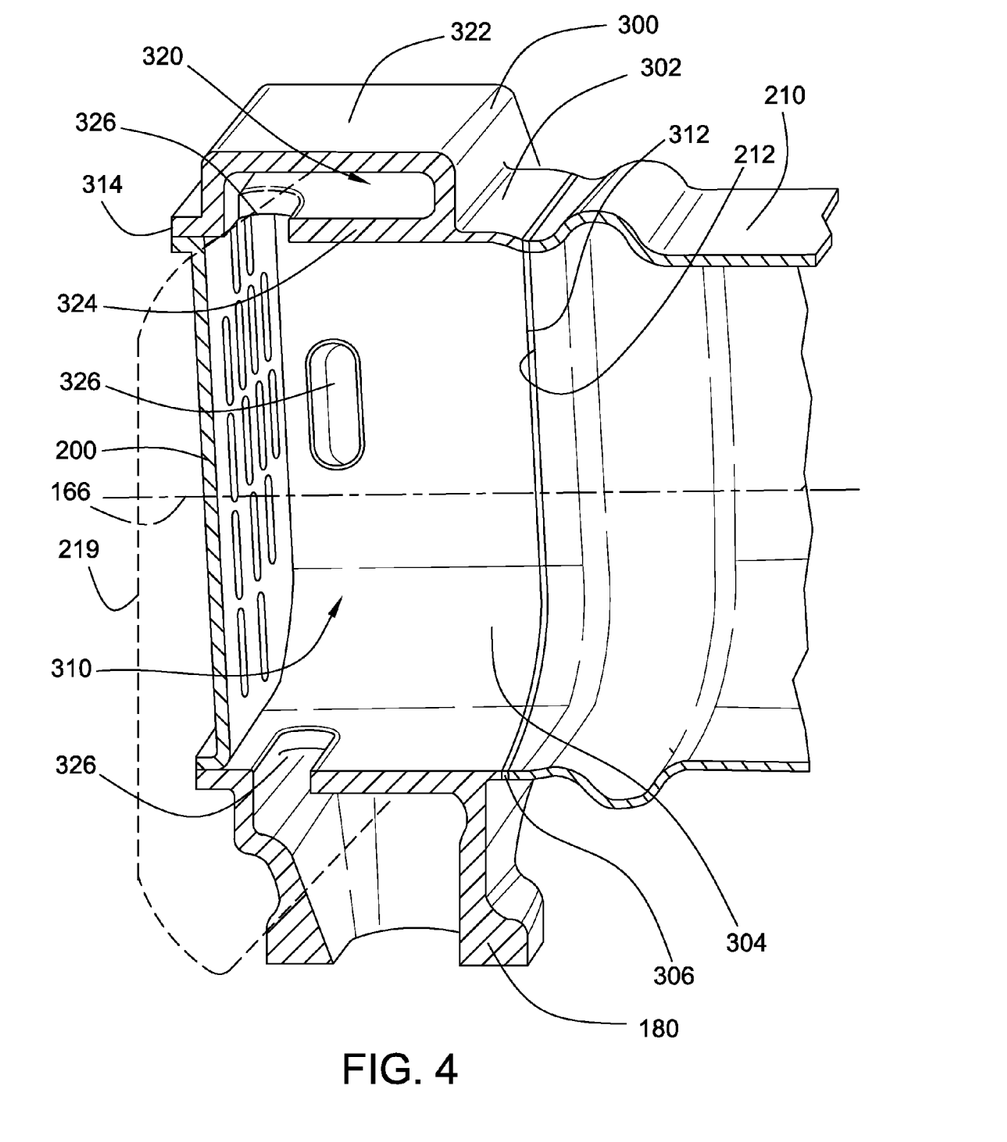
FIG. 4 is a cross-sectional view taken along line A-A of one embodiment of the heat exchanger of FIG. 2 showing a coolant inlet structure in the form of a collar having a plurality of coolant introduction paths disposed about the tube core to introduce coolant to the coolant channels therein.

Referring to FIG. 4, there is illustrated an embodiment of the heat exchanger with an improved coolant introduction system wherein the coolant inlet line, circuit or duct is embodied as a coolant inlet collar 300 to be disposed about the upstream face of the tube core that, for ease of understanding, is not shown in FIG. 4. The inlet collar 300 can be formed as a continuous, ring-like structure that, because of the square arrangement of the tubes, can have a corresponding square outline. Forming the square outline can be a first sidewall 302, an integral second sidewall 304 depending at a 90° angle from the first sidewall, a third sidewall 306 opposite the first sidewall, and a forth sidewall that is not shown for clarity purposes but would be opposite the second sidewall. The square outline of the inlet collar 300 defines an interior void or interior region 310. Accordingly, when attached as part of the heat exchanger, the inlet collar 300 can be disposed about and surround the longitudinal axis line 166 that passes centrally through the interior region 310.

The inlet collar 300 can have a width provided by the integral first sidewall, second sidewall, third sidewall, and fourth sidewall to form a first surface or first edge 312 and an opposing second surface or second edge 314, both of which follow the substantially square outline of the inlet collar. The first edge 312 can be joined to the correspondingly shaped first rim 212 of the core shell 210 by welding, brazing or the like. Constrained at the opposite second edge 314 of the inlet collar 300 and traversing the interior region 310 is the upstream header plate 200. For example, the header plate 200 and the second edge 314 can be joined along abutting flange structures by brazing, welding or the like. When the tube core is included and interfaced at its upstream face with the upstream header plate 200, the inlet collar 300 will be disposed about and surround the tube core coextensively with the upstream face.

To distribute coolant substantially about the tube core, the inlet collar 300 can include a hollow, enclosed coolant duct 320 that is generally aligned along the loop 219 to circumscribe the interior region 310. The coolant duct 320 can be a generally flat, hollow void external of the first sidewall 302, second sidewall 304, third sidewall 306 and forth sidewall that is enclosed by a duct cover 322 disposed about the exterior of the inlet collar 300. The coolant duct 320 can be separated from the interior region 310 by an inner barrier wall 324 that, in the illustrated embodiment, can be formed by portions of the first sidewall 302, second sidewall 304, third sidewall 306 and fourth sidewall.

Specific introduction points or paths can be disposed through the barrier wall 324 so that coolant flowing in the coolant duct 320 can flow or pass to the tube core 192. In the embodiment shown in FIG. 4, the introduction points can be formed as a plurality of oblong orifices 326 disposed through the barrier wall 324 establishing fluid communication between the duct 320 and the interior region 310. In the illustrated embodiment, at least one orifice 326 is associated with each of the first sidewall 302, second sidewall 304, third sidewall 306 and fourth sidewall of the inlet collar 300 but other embodiments can have different shapes, numbers, or arrangement of the orifices. Moreover, while the coolant duct 320 can circumscribe and direct fluid around the longitudinal axis line 166 in the direction of the loop 219, the orifices 326 are oriented to direct fluid inwardly toward the longitudinal axis line 166 so that at least a portion of the coolant may converge at the longitudinal axis line. In other words, the orifices 326 are arranged to direct coolant radially inward toward the common longitudinal axis line 166 from the surrounding coolant duct 320. For example, referring to FIG. 4, the opposing orientations of the orifices 326 associated with the first sidewall 302 and the opposite third sidewall 306 of the inlet collar 300 introduces fluid inwardly toward the longitudinal axis line 166 from two different directions. Multiple introduction paths, directions or approaches for introducing coolant to the tube core facilitates distributing fresh coolant uniformly across the header plate 200 and the adjacent upstream face of the tube core.

In another embodiment, rather than completely circumscribe the tube core, the coolant inlet line can partially circumscribe the tube core, for example, approximately halfway. Referring to FIG. 4, the inlet collar 300 might be constructed so that the tube duct 320 only extends along the first sidewall 302, second sidewall 304 and third sidewall 306, but not along the un-illustrated fourth sidewall. The coolant, though, would still be directed about three sides of the coolant inlet collar 300 and could still be directed radially inward by the orifices 326 through three sides of the tube core to converge at the longitudinal axis line 166. In the particular embodiment, at least two orifices 326 are opposed 180° across from each other such that two coolant inlet paths are directed at each other in a converging manner. In this embodiment, the coolant inlet line would still be substantially disposed about the tube core.

To communicate with the coolant system 140, the coolant feed connection 180 can be disposed on the inlet collar 300, for example, protruding from the bottom second side 306 of the inlet collar 300. The coolant duct 320 can be in fluid communication with the coolant feed connection 180. An advantage of this arrangement is that a single connection point such as a hose fitting can be made to the coolant system 140 and still distribute coolant substantially around and about the tube core to provide multiple introduction paths in multiple directions radially inward toward the common longitudinal axis line 166. To recover heated coolant from the heat exchanger 160, in one exemplary embodiment a similar coolant outlet collar can be disposed at the downstream end so that coolant is uniformly removed from the downstream face of the tube core. Alternative exemplary embodiments include configurations wherein the outlet 182 does not include a collar configuration. The inlet collar 300 can be made from metal or another suitable material and can be made as a cast part, for example, by lost wax or investment casting.

Figure 5:
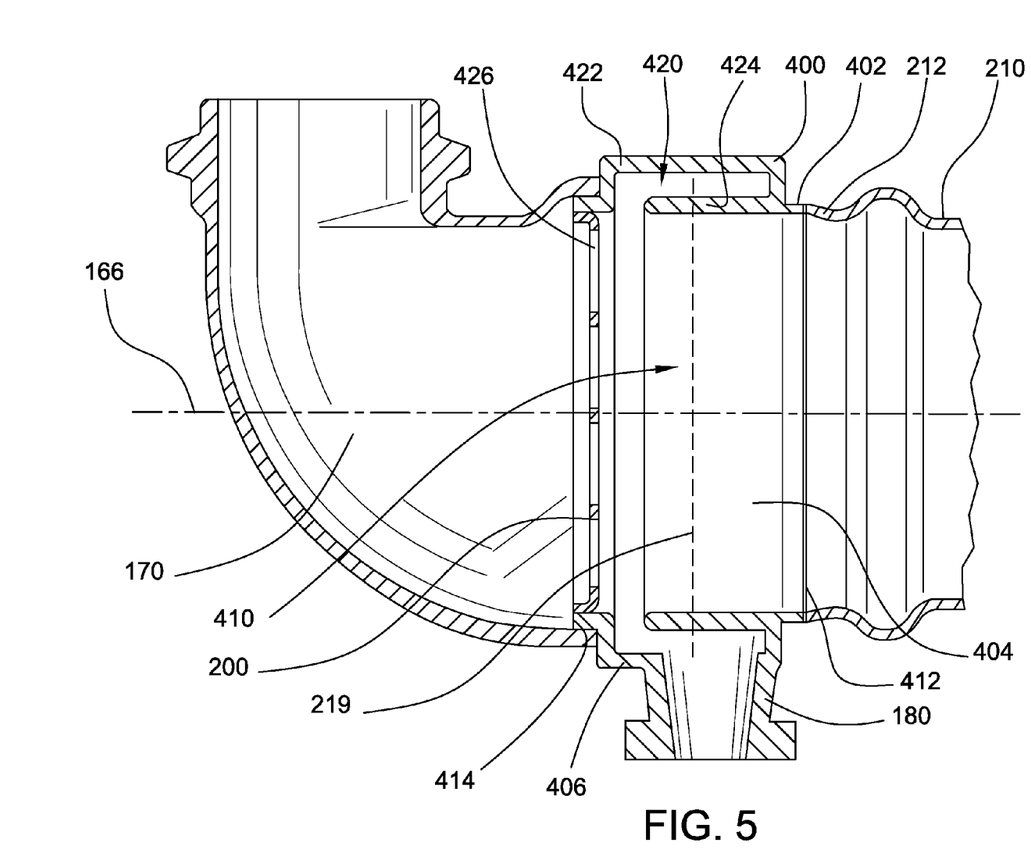
FIG. 5 is a cross-sectional view similar to FIG. 4 of another embodiment of the heat exchanger showing a coolant inlet structure in the form of a collar with a coolant introduction slot disposed continuously about the tube core and communicating with the coolant channels therein.

Referring to FIG. 5, there is illustrated another embodiment of an inlet collar 400 for uniformly distributing coolant into the tube core of a heat exchanger 160. The inlet collar 400 can again have a generally square outline including a first sidewall 402, a second sidewall 404, a third sidewall 406, and a forth sidewall that for clarity is not explicitly depicted. The square outline of the sidewalls surrounds and delineates an interior void or interior region 410. The inlet collar 400 can be joined or attached along a first edge 412 that corresponds to the square outline formed by the integral sidewalls to the correspondingly shaped first rim 212 of the core shell 210. The second edge 414 of the inlet collar 400 can constrain the upstream header plate 200 that traverses the interior region 410. The second edge 414 also joins to the exhaust gas inlet diffuser 170 that directs the incoming exhaust gasses through the header plate 200 and into the interior region 410.

To direct the coolant about the inlet collar 400 for uniform distribution into the tube core, the inlet collar can include a coolant duct 420 disposed continuously about the exteriors of the first sidewall 402, second sidewall 404, third sidewall 406 and fourth sidewall so that the duct circumscribes the centrally disposed longitudinal axis line 166. The coolant duct 420 can be a low, flat, void that is enclosed by an external duct cover 422 joined to and partially offset from the sidewalls. To separate the coolant duct 420 from the interior region 410, a barrier wall 424 can be formed from the portions of the first sidewall 402, second sidewall 404, third sidewall 406 and fourth sidewall underneath the duct cover 422 so that the barrier wall serves as the interior of the hollow duct. In the illustrated embodiment, the coolant duct 420 can trace the outline disposed around and circumscribing the longitudinal axis line 166 by the loop 219 in a substantially annular manner.

To introduce coolant from the coolant duct 420 into the interior region 410 and the upstream face of the tube core that will be disposed therein, an introduction path can be established by a slot 426 disposed through the barrier wall 424 continuously along the first sidewall 402, second sidewall 404, third sidewall 406 and forth sidewall. The slot 426 therefore forms an inwardly directed flow path that is generally radially oriented toward the longitudinal axis line 166 so that at least a portion of the incoming coolant may converge at the central longitudinal axis line. Moreover, the slot 426 can be shifted closer to the second edge 414 than the first edge 412 so that radially incoming coolant can flow adjacent or proximate to the upstream header plate 200. The continuous or uninterrupted design of the slot 426 facilitates uniform distribution of coolant across the upstream header plate 200 and upstream face of the tube core that will be adjacent to the header plate. The width of the slot 426 can be dimensioned proportional to the width of the coolant duct 420 so that coolant is evenly distributed about the duct for uniform introduction to the interior region from substantially all directions. Alternative embodiments include configurations wherein the width of the slot 426 may be varied depending on a distance from the coolant feed connection 180; for example, the width of the slot 426 may be greatest at a location disposed furthest from the coolant feed connection 180.

Figure 6:
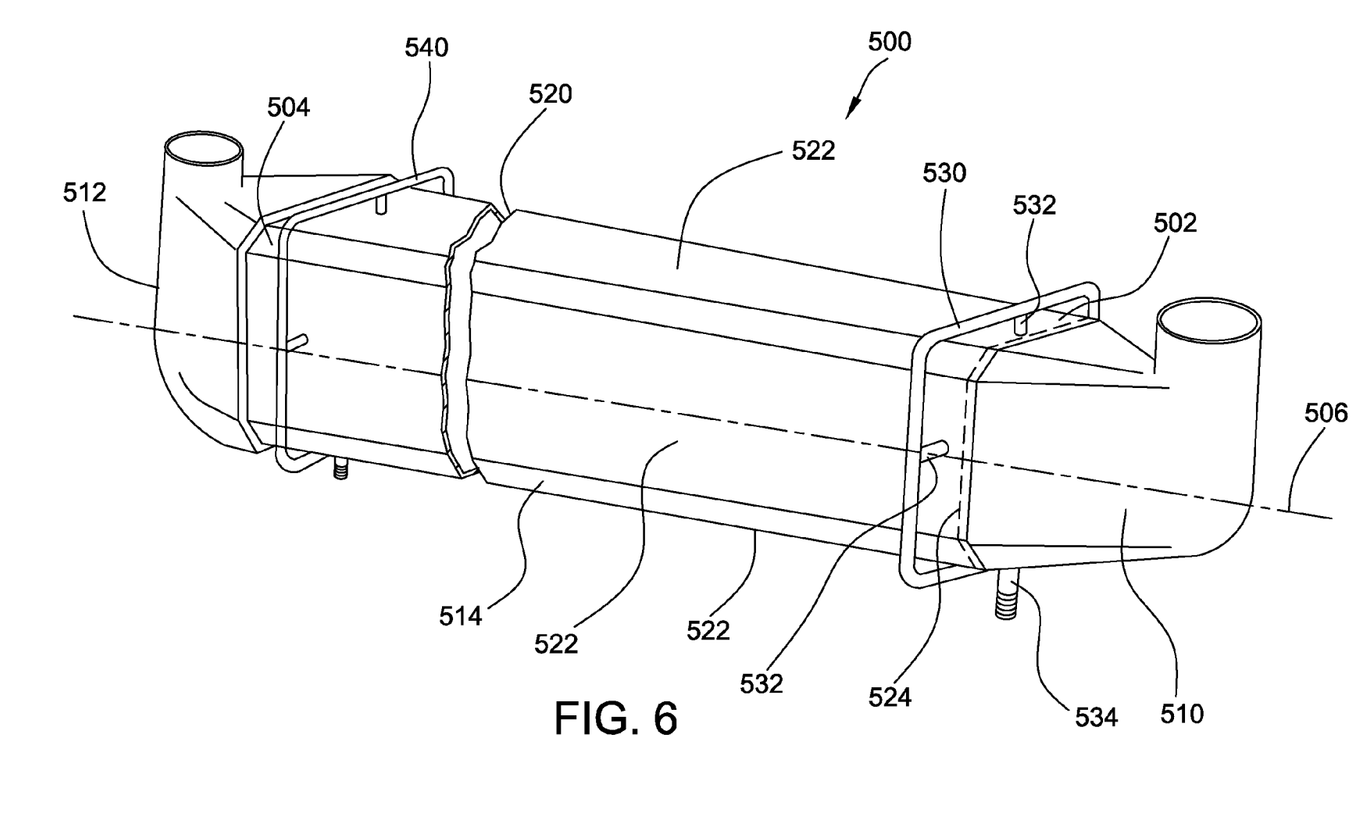
FIG. 6 is a perspective view of another embodiment of the heat exchanger including a coolant inlet line or circuit disposed externally about an upstream end of the tube core and communicating with the coolant channels disposed therein.

Referring to FIG. 6, there is illustrated another embodiment of the heat exchanger 500 configured to uniformly distribute coolant into the upstream end 502 wherein the coolant line, circuit or duct is situated externally of the heat exchanger. The illustrated heat exchanger 500 can again be an elongated, rectangular structure extending between an upstream end 502 and an opposing downstream end 504 aligned along a longitudinal axis line 506. To receive the hot exhaust gasses and redirect the exhaust gasses to flow through the main body 514 substantially parallel to the longitudinal axis line 506, an exhaust gas inlet diffuser 510 can be attached to the main body 514 at the upstream end 502 of the heat exchanger 500. A similar exhaust gas outlet diffuser 512 can be attached at the opposite downstream end 504 of the main body 514. The main body 514 can include an outer hollow housing or core shell 520 that houses the plurality of exhaust gas tubes arranged in a tube core or bundle. The core shell 520 can have a rectangular or square cross-section with four sides 522 arranged 90° to each other to correspond to the square arrangement of the tube core or bundle.

The coolant inlet line 530 or circuit can be formed as series of hollow, tubular pipes 532 connected together at 90° angles and arranged in a loop disposed about the upstream end 502 of the heat exchanger 500. The pipes can be standard plumping pipes and fittings such as 90° elbows that can be threaded together, although in other embodiments more complex piping arrangements can be used. To communicate coolant from the external coolant line 530 to the coolant channels in the tube core, a plurality of coolant introduction paths 532 in the form of T-fittings or the like can intersect the coolant line and be partially disposed or tapped into the core shell 520. The coolant introduction paths 532 can enter the core shell 520 behind the inlet diffuser 510 and the location of the upstream header plate 524, indicated in dashed lines, so that coolant will be directed into the coolant channels and remain separated from the exhaust gasses. To maintain the external nature of the coolant introduction line 530, the T-fittings can also space the coolant introduction line 530 apart from the core shell 520 so that it is non-contiguous with the core shell.

In the illustrated embodiment, one coolant introduction path 532 can be associated with each of the four sides 522 of the core shell 520. The T-fittings forming the coolant introduction paths 532 direct coolant inwardly toward the longitudinal axis line 506 so that at least a portion of the coolant can converge in the center of the tube core before proceeding lengthwise through the heat exchanger 500. Accordingly, coolant is uniformly distributed radially into the upstream end 502 to prevent localized heating proximate the header plate 524. To communicate and receive fresh coolant from the coolant system, a single coolant feed connection 534 can depend from the coolant introduction line. To remove heated coolant from the heat exchanger 500, a similar coolant outlet line 540 can be disposed about the downstream end 504.

INDUSTRIAL APPLICABILITY

The present disclosure is applicable to heat exchangers in general and to a heat exchanger associated with an EGR system to cool exhaust gasses. Referring to FIG. 1, an internal combustion engine 102 can combust fuel such as diesel producing exhaust gasses. To reduce emissions, the EGR system 150 can redirect a portion of the exhaust gasses back to the intake manifold 110 through an intermediary heat exchanger 160 to cool the hot gasses by thermal exchange with a coolant from a coolant system 140 associated with the engine 102. Referring to FIG. 4, the incoming hot exhaust gasses can enter a plurality of exhaust gas tubes bundled into a tube core through an upstream header plate 200 after aligning with a longitudinal axis line 166 of the heat exchanger 160. To remove thermal energy from the exhaust gasses, coolant can be introduced to coolant channels between the plurality of exhaust tubes in the tube core 192.

In particular, the coolant can enter an interior region 310 proximate where an upstream header plate 200 joins the tubes from a plurality of different introduction paths communicating with a coolant inlet line, circuit or coolant duct 320 that can be disposed in a loop 219 about and circumscribing the tube core. The coolant duct 320 uniformly distributes fresh coolant around the tube core 192 and the introduction paths are arranged to direct coolant inwardly toward the centrally aligned longitudinal axis line 166 of the heat exchanger and tube core. At least a portion of the radially inward directed coolant can converge at the longitudinal axis line 166 before it is redirected to flow axially along the axis line toward the downstream end of the heat exchanger. Accordingly, the coolant is uniformly distributed across the header plate 200 and the adjacent upstream face of the tube core to facilitate replenishment of coolant in these critical areas.

Figure 7A:
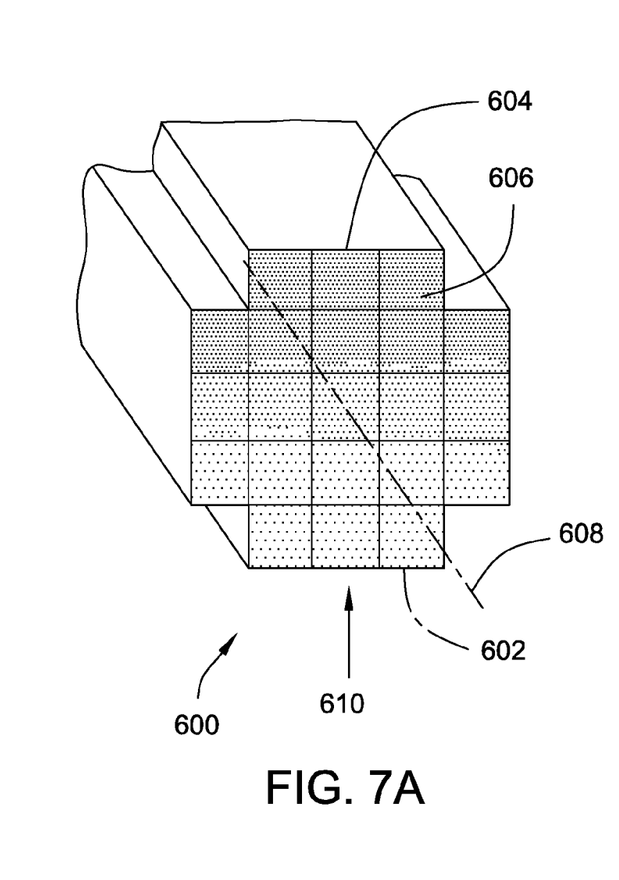
FIGS. 7A and 7B are schematic representations of the upstream face of the tube core indicating the thermal pattern produced by a single coolant introduction point and by a uniform distribution of coolant from a coolant inlet line or duct disposed about the tube core, respectively.
Figure 7B:
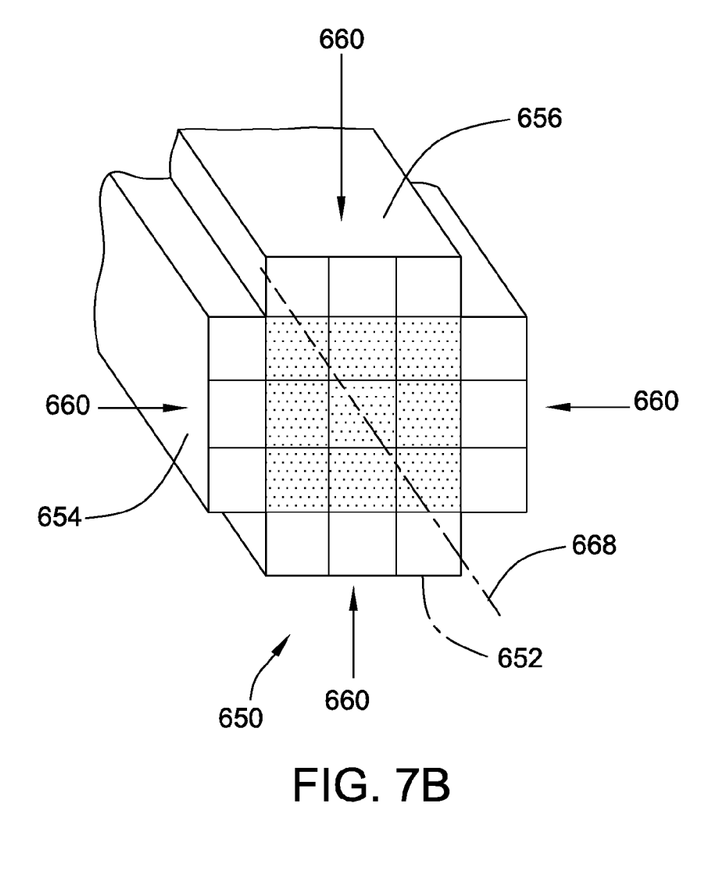

Referring to FIGS. 7A and B, a comparison is made of the thermal patterns produced at the header plate/tube core interface in a heat exchanger having a single coolant inlet verses one having multiple coolant introduction paths circumscribing the tube core. As shown in FIG. 7A, introducing coolant through a single inlet 610 disposed on a first side 602 of a heat exchanger 600 fails to remove a significant portion of the thermal energy 606, as indicated by shading with heavier shading representing greater heat, at an opposite second side 604 of the heat exchanger. This is because the incoming coolant will generally be redirected to flow along the longitudinal axis line 608 lengthwise through the heat exchanger 600 before reaching the second side 604. Coolant already proximate the second side 604 may remain stagnate there causing localized heating and cracking of the tube/header plate joints that would allow intermixing of the coolant and exhaust gasses.

In contrast, in FIG. 7B, introducing coolant through a plurality of coolant introduction paths circumscribing the tube core removes a larger portion of the thermal energy 666, as again indicate by shading, from the heat exchanger 650. Specifically, including a radially oriented introduction path 660 at each of the first side 652, second side 654, third side 656, and fourth side 658 of the heat exchanger 600 can direct coolant across a significant portion of the header plate/tube core interface that can converge at the longitudinal axis line 668. Coolant across the header plate/tube core interface is consistently replenished avoiding localized heating and possible cracking or leak formation.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A heat exchanger for an exhaust gas recirculation unit comprising:
   a tube core including a plurality of exhaust gas tubes extending from an upstream face to a downstream face to define a longitudinal axis line, the tube core including a plurality of coolant
   channels disposed between and separating the plurality of exhaust gas tubes; and
   a coolant inlet line disposed about at least a portion of the tube core proximate the upstream face and generally perpendicular to the longitudinal axis line, the coolant line including a coolant duct separate from the tube core by a barrier wall, the coolant duct and barrier wall at least partially circumscribing the longitudinal axis line, the coolant inlet line directing coolant inwardly toward the longitudinal axis line through an introduction path disposed through the barrier wall, at least a portion of the coolant converging at the longitudinal axis line.

2. The heat exchanger of claim 1, wherein the coolant inlet line is formed in a coolant inlet collar disposed about the tube core proximate the upstream face, the coolant inlet collar including the coolant duct.

3. The heat exchanger of claim 2, wherein the introduction path is provided by a plurality of orifices disposed through the barrier wall.

4. The heat exchanger of claim 3, wherein at least two orifices are arranged in opposing positions across the tube core.

5. The heat exchanger of claim 2, wherein the introduction path is provided by a slot disposed through the barrier wall continuously about the tube core.

6. The heat exchanger of claim 2, wherein the coolant duct defines a loop circumscribing the tube core.

7. The heat exchanger of claim 6, wherein the plurality of exhaust gas tubes are parallel to each other and the tube core extends between the upstream face and the downstream face along a longitudinal axis line, the loop being generally perpendicular to the longitudinal axis line.

8. The heat exchanger of claim 2, further comprising a coolant outlet collar disposed about at least a portion of the tube core proximate the downstream face, the coolant outlet collar communicating with the coolant channels in the tube core.

9. The heat exchanger of claim 1, further comprising an upstream header plate interfacing with the upstream face of the tube core.

10. The heat exchanger of claim 1, further comprising a core shell disposed about the tube core and extending substantially along the longitudinal axis line; wherein the coolant inlet line is disposed about the tube core externally of the core shell, the coolant inlet line communicating with the coolant channels in the tube core via fluid introduction paths disposed through the core shell.

11. The heat exchanger of claim 10, wherein the coolant inlet line includes external piping offset from the core shell and disposed in a loop about the tube core.

12. The heat exchanger of claim 11, wherein the fluid introduction paths are formed by T-fittings intersecting the external piping and disposed into the core shell.

13. A method of cooling exhaust gasses in an exhaust gas recirculation (EGR) system comprising:
providing a tube core including a plurality of tubes separated from each other by coolant channels,
providing a coolant inlet line disposed about at least a portion of the tube core, the coolant line including a coolant duct separated from the tube core by a barrier wall, the coolant duct and barrier wall at least partially circumscribing the tube core;
introducing exhaust gasses to the plurality of tubes through an introduction path disposed through the barrier wall;
directing a coolant from the coolant inlet line to the coolant channels via an introduction path disposed substantially about the tube core.

14. The method of claim 13, wherein the coolant inlet line is formed as a coolant duct separated from the tube core by a barrier wall and the introduction path is provided by a plurality of orifices disposed through the barrier wall.

15. The method of claim 13, wherein the coolant inlet line is formed as a coolant duct separated from the tube core by a barrier wall and the introduction path is provide by a continuous slot disposed through the barrier wall.

16. The method of claim 13, wherein the plurality of tubes are aligned parallel to a longitudinal axis line, and the coolant inlet line is generally perpendicular to the longitudinal axis line.

17. The method of claim 13, wherein the coolant inlet line circumscribes the tube core in a loop, and the introduction path is disposed around the loop.

18. A heat exchanger for an exhaust gas recirculation system comprising:
a tube core including a plurality of exhaust gas tubes extending between an upstream face and a downstream face, the exhaust gas tubes fluidly separated from each other by coolant channels;
an exhaust gas inlet diffuser in fluid communication with the upstream face of the tube core;
an exhaust gas exit diffuser in fluid communication with the downstream face;
a coolant inlet line including a coolant duct disposed about at least a portion of and separated from the tube core by a barrier wall proximate the upstream face, the coolant inlet line communicating with the coolant channels by a coolant introduction path disposed through the barrier wall introducing coolant inwardly toward the tube core from at least two opposing directions.

19. The heat exchanger of claim 18, wherein the plurality of exhaust gas tubes are aligned along a longitudinal axis line, and the coolant introduction path introduces coolant to the tube core from multiple directions to converge at the longitudinal axis line.

20. An exhaust gas recirculation (EGR) system associated with an internal combustion engine, the EGR system comprising:
an EGR line diverting a portion of the exhaust gasses from an exhaust system of the internal combustion engine to an intake system of the internal combustion engine;
a coolant system circulating coolant; and
a heat exchanger disposed in the EGR line, the heat exchanger including a plurality of exhaust gas tubes receiving hot exhaust gasses and a plurality of coolant channels separating the exhaust gas tubes, the heat exchanger further including a coolant inlet line disposed about at least a portion of the plurality of exhaust gas tubes; the coolant line including a coolant duct separated from the plurality of exhaust gas tubes by a barrier wall, the coolant duct and barrier wall at least partially circumscribing the plurality of exhaust gas tubes; the coolant line introducing coolant inwardly to the coolant channels via an introduction path disposed through the barrier wall.

* * * * *